(12) United States Patent
Wolfe et al.

(10) Patent No.: US 12,718,676 B2
(45) Date of Patent: Aug. 25, 2026

(54) NFC TAG-BASED CONTAINER ALERTING SYSTEM

(71) Applicants: David G. Wolfe, Wexford, PA (US); Spencer W. Allen, Knoxville, TN (US)

(72) Inventors: David G. Wolfe, Wexford, PA (US); Spencer W. Allen, Knoxville, TN (US)

( * ) Notice: Subject to any disclaimer, the term of this patent is extended or adjusted under 35 U.S.C. 154(b) by 7 days.

(21) Appl. No.: 18/987,716

(22) Filed: Dec. 19, 2024

(65) Prior Publication Data

US 2025/0239144 A1 Jul. 24, 2025

Related U.S. Application Data

(60) Provisional application No. 63/623,703, filed on Jan. 22, 2024.

(51) Int. Cl.
*G08B 13/24* (2006.01)
*G06Q 10/0833* (2023.01)

(52) U.S. Cl.
CPC ..... *G08B 13/2462* (2013.01); *G06Q 10/0833* (2013.01)

(58) Field of Classification Search
CPC ........................ G08B 13/2462; G06Q 10/0833
See application file for complete search history.

(56) References Cited

U.S. PATENT DOCUMENTS

2009/0322510 A1* 12/2009 Berger .................. H04W 60/00 340/568.1
2019/0164114 A1* 5/2019 Kadotani ............. G06Q 10/083
2020/0286035 A1* 9/2020 Berger ................... G06Q 10/08
2023/0121499 A1* 4/2023 Paul ...................... B60P 1/6418 414/467

* cited by examiner

*Primary Examiner* — Sisay Yacob

(57) ABSTRACT

The present invention relates to systems and methods for tracking transported items, particularly in hospital pneumatic tube systems for delivering medications. A key challenge in such systems is the frequent occurrence of missing or misplaced items, which disrupts workflow and compromises patient care. This invention addresses the problem by incorporating an alarm device on a transport container, alongside arming and disarming devices at loading and unloading locations. The alarm activates if the container is opened without disarming, providing a reminder while allowing urgent access when needed. The system records essential tracking information, including the container's contents, user identity, and time of access. By linking this data, the invention enables real-time tracking and accountability, reducing medication loss while maintaining accessibility during emergencies. This solution enhances operational efficiency and supports the accurate delivery of critical items.

12 Claims, 6 Drawing Sheets

NFC TAG-BASED CONTAINER ALERTING SYSTEM

FIELD OF THE INVENTION

The present invention relates generally to systems and methods for tracking deliveries. More specifically, the invention pertains to tracking deliveries transported via pneumatic tube systems.

BACKGROUND OF THE INVENTION

In many operational settings, there exists a need to track the delivery of items to ensure proper accountability and logistics. In particular, hospital pharmacy departments often require accurate tracking of first-dose and other ad-hoc medications transported to nursing units. These medications are frequently delivered using pneumatic tube systems, which are integral to efficient hospital operations.

Existing tracking solutions commonly rely on mechanisms that restrict physical access to items until tracking information is collected. Such mechanisms may include physical locks, either mechanical or electronic, applied to the transport container, or the retention of the container within the transport system itself. In these systems, access is withheld until a user provides identifiable credentials, such as a badge, PIN, or other form of authentication.

While these methods can effectively track item deliveries, they may inadvertently hinder timely access during emergencies or other critical situations. In scenarios where immediate access to the delivered item is required, the additional steps of credential verification or container unlocking can introduce delays that may compromise patient care or operational efficiency. Accordingly, there exists a need for improved tracking solutions that maintain accountability without impeding access in urgent circumstances.

SUMMARY OF THE INVENTION

There is thus provided, in accordance with some embodiments of the invention, a system and method that ensures delivery tracking without imposing additional delays on nursing personnel or restricting access during emergencies.

The present invention utilizes an alarm-based system that does not physically sequester or lock the pneumatic tube carrier. Instead, it incorporates a disarming mechanism that requires minimal interaction by authorized staff, thereby capturing key tracking information without imposing additional access restrictions. Prior to accessing the carrier, the authorized staff member performs a simple disarming step that records essential data, including 1) the identity of the staff member accessing the carrier, 2) the unique identity of the carrier itself, which links to the medication it contains, and 3) the exact time of access. By recording this information, the system enables accurate tracking of each medication delivery and retrieval, providing pharmacy and nursing personnel with a clear record of the medication's location and handling history.

If the carrier is opened without first completing the disarming step, an alarm is triggered to alert nursing personnel that the carrier was accessed improperly. This alarm serves as a low-impact reminder to disarm the carrier, encouraging adherence to the disarming protocol without physically preventing access in urgent situations. As such, the alarm functions as a deterrent rather than a barrier, balancing tracking with accessibility. In scenarios where immediate access to the medication is critical, the system's non-restrictive design allows for rapid retrieval without requiring additional steps or credentials.

This inventive approach provides significant advantages in managing medication tracking and accountability within the pneumatic tube delivery system. By capturing key data points at the time of carrier access, the system facilitates real-time tracking and provides pharmacy and nursing staff with immediate visibility into the medication's status. This tracking capability effectively addresses the problem of missing or misplaced medications by pinpointing the last known location and access details, thereby reducing duplication of efforts and the associated costs of medication replacement. Overall, this invention enhances delivery accuracy, improves workflow efficiency, and supports high-quality patient care by providing a streamlined, accessible solution for medication delivery tracking within hospital pneumatic tube systems.

In one form of the invention, the alarm could be an auditory alert system that emits a loud, attention-grabbing sound, such as a beep or chime, whenever a pneumatic tube carrier is accessed without first completing the disarming procedure. The sound can be designed to be easily noticeable in busy hospital environments, ensuring that nursing or pharmacy staff are promptly alerted to any unauthorized access. The volume of the alarm can be adjustable to balance its effectiveness with the need for a non-disruptive hospital environment.

In another form of the invention, the alarm could be a visual indicator, such as a flashing LED light, which activates when a carrier is opened without the disarming step being completed. The visual alarm serves as a clear, non-auditory signal to alert staff that the medication carrier has been accessed improperly. The LED light could use different colors or flashing patterns to convey specific states of the system, such as "access without disarming" or "carrier disarmed," providing staff with immediate visual cues about the carrier's status.

In yet another form of the invention, the alarm could take the form of a vibration-based alert system that activates when the disarming step is bypassed. This type of alarm offers a tactile feedback mechanism that is less intrusive than an auditory alarm, making it suitable for environments where loud noises may be inappropriate, such as near patient rooms. The vibration can be felt by the staff accessing the carrier, providing a discreet yet effective means of notifying them of unauthorized access.

In a further form of the invention, the alarm could be integrated with the hospital's communication systems to send text messages, emails, or app-based notifications to nursing or pharmacy staff when a pneumatic tube carrier is accessed without disarming. This form of the alarm provides a real-time digital record of the access event, including the time of access and the identity of the staff member involved. The system could automatically log and track each access attempt, offering immediate visibility into carrier activity and ensuring that personnel are aware of any potential issues with the delivery process.

In one form of the invention, the arming and/or disarming action could be performed by swiping an authorized ID badge or access card through a card reader or scanning the badge using a built-in scanner. This simple and secure action disables the alarm and grants access to the pneumatic tube carrier. The card swipe or badge scan could be integrated with the hospital's existing access control system, ensuring that only authorized personnel can disarm the alarm, providing an efficient and familiar method for staff to interact with the system.

In another form of the invention, the arming and/or disarming action could involve the entry of a unique PIN or password on a keypad or touchscreen interface located on or near the pneumatic tube carrier. This method ensures that only personnel with the correct credentials can disable the alarm, adding a layer of security and accountability to the access process. The PIN or password could be issued to specific staff members or departments and logged to provide an audit trail of who accessed the medication carrier and when.

In yet another form of the invention, the arming and/or disarming action could involve biometric authentication, such as a fingerprint scan or facial recognition, to verify the identity of the individual accessing the pneumatic tube carrier. This method provides a high level of security by ensuring that only authorized staff members, whose biometric data has been pre-registered, can disarm the alarm. Biometric authentication enhances accountability by linking access to a specific individual and can be seamlessly integrated with existing hospital security systems.

In a further form of the invention, the arming and/or disarming action could be triggered by tapping an NFC-enabled device, such as a staff member's badge or smartphone, on an NFC reader located near the pneumatic tube carrier. This method offers a quick and efficient way to disarm the alarm, requiring minimal effort from the staff member while ensuring that the access action is logged. The use of NFC technology also reduces the need for physical contact, streamlining the process and enhancing the overall efficiency of medication delivery in busy hospital environments.

Other objects, aspects, purposes and advantages of the presently described system and method can be obtained from a study of the specification, the drawings, and the appended claims.

DETAILED DESCRIPTION OF THE INVENTION

It should be understood that the description of the invention is intended to be illustrative and not limiting. While specific embodiments and implementations of the invention are described in detail, various modifications and alternatives will be apparent to those skilled in the art. The invention can be implemented in numerous ways, and the elements described herein may be combined, altered, or substituted with other technologies or methods without departing from the spirit or scope of the invention. The scope of the invention is therefore not limited to the specific embodiments described, but rather by the claims appended hereto.

Additionally, while the invention is described in the context of medication deliveries via pneumatic tube systems within hospital settings, other applications in other settings can utilize the invention with other containers, transport systems, etc., with a need for non-locking, alarm-based delivery tracking and reporting.

In the preferred embodiment of the invention, the pneumatic tube carrier is fitted with an NFC based alarm device providing the alarm, arming, and disarming functions. The alarm is a combined audible and LED flashing alarm, and the arming and disarming action is carried out by accessing the NFC device with a NFC capable reader, i.e. smartphone running an NFC application or an equivalent NFC read/write device.

Referring initially to FIGS. 1-4, pneumatic tube system carrier 100 is fitted with alarm device 101 by means of attaching mounting features 102.

Carrier 100 provides an LED opening 103 and contains a magnet 104 attached thereto such that when the carrier 100 is closed the magnet 104 is in close proximity to alarm device 101. The magnet 104 in close proximity to the alarm device 101 is detected to indicate that the carrier 100 is in the open or closed state. Thus, the alarm device 101 always knows if the carrier 100 is open or closed.

FIGS. 5-8 show the alarm device 101 with elements LED 105, mounting features 102, enclosure tabs 106, and curvature 107 to match the carrier inner surface. Differing size carriers 100 will utilize a differing degree of curvature depending on the carrier 100 dimension specifics, i.e. a 6" vs. 4" diameter for example.

FIG. 9 shows an exploded view of the alarm device 101 comprising electronic assembly 108, enclosure front 109, enclosure back 110, and gasket 111. Gasket 111 provides a liquid tight seal for the alarm device 101 enclosure to protect the electronic assembly 108 in the event of a liquid content rupture.

FIGS. 10-11 show the electronic assembly 108 in detail, comprising circuit board 112, NFC antenna 113, NFC circuitry 114, coin cell battery 115, audible buzzer 116, LED 105, hall effect sensor 117, and microcontroller 118.

The microcontroller 118 is connected to the hall effect sensor 117, NFC circuitry 114, audible buzzer 116, and LED 105.

The microcontroller 118 operates in conjunction with the NFC circuitry 114 to facilitate the functionality of an emulated NFC tag. This implementation utilizes standard NFC communication protocols and methods, enabling compatibility with a wide range of NFC-enabled devices.

FIG. 12 shows an exemplary embodiment of an arming device, wherein a smartphone running an NFC application 119 is positioned in proximity to a carrier 100 equipped with an alarm device 101. The smartphone, functioning as the arming device, is configured to interact with the alarm device 101 via NFC communication.

FIG. 13 shows an exemplary embodiment of a disarming device, comprising an NFC-enabled system 120. The NFC-enabled system 120 includes an NFC read/write device 121 operatively connected to a computing device 122. The computing device 122 may further include an attached display device 123 for providing visual feedback or additional functionality.

It should be noted that the arming device may alternatively utilize an NFC-enabled system 120, and the disarming device may employ a smartphone running an NFC application 119. Moreover, the same NFC-enabled system 120 or smartphone running an NFC application 119 can serve as both the arming and disarming device, depending on the operational requirements and configurations of the system.

In addition to its role in emulating an NFC tag, the microcontroller 118 is further configured to manage the transition between "armed" and "disarmed" states. These state transitions are initiated through the processing of specific, coded messages received from an arming device or a disarming device. The microcontroller 118 interprets these messages, which are written to the NFC tag via standard write operations, to modify the state of the system accordingly. By leveraging these special coded messages, the system ensures that the alarm functionality responds dynamically to the operational context, providing a robust mechanism for state management.

When not in use the microcontroller 118 and NFC circuitry 114 are in a power down "off" state to preserve battery 115 life. In this "off" state a transition of the hall effect sensor 117 caused by removal of the magnet 104 will power up microcontroller 118 and NFC circuitry 114. Thus the act of opening the carrier 100 will power up the alarm device 101.

Initially the alarm device 101 will power up in a "disarmed" state, ready for the carrier 100 to be loaded with item(s) for delivery.

After the carrier 100 is loaded and closed at a loading location, the user arms the alarm device 101 utilizing an NFC-enabled arming device. During this process, the arming device performs two primary functions. First, it reads the unique identification associated with the carrier 100, enabling the system to associate the carrier 100 with its specific contents or delivery context. Second, the arming device transmits a specially coded message to the alarm device 101. This coded message is written to the alarm device's emulated NFC tag, thereby transitioning the alarm device 101 into an "armed" state. This operation ensures that the alarm functionality is activated and ready to respond to unauthorized access or tampering during transport.

Additionally the arming device will collect information related to the contents of the carrier 100 by, for example, reading barcodes on the items.

The information collected, including the contents of the carrier 100, the unique identification of the carrier 100, and a timestamp corresponding to the interaction, may be communicated by the arming device to a database. This database serves to facilitate further processing, such as generating detailed reports, maintaining a historical record of the carrier's tracking data, and providing real-time or periodic status updates to users. Such updates enhance the system's utility by enabling users to monitor the carrier's status and ensure accurate tracking throughout the delivery process.

In the "armed" state the alarm device 101 will periodically flash the LED 105 as an indication of "armed" status.

In the "armed" state, if the carrier 100 is opened the audible buzzer 116 and LED 105 will activate indicating to the user that the proper process to disarm the alarm device was not followed.

At the unloading location, when the alarm device is in the "armed" state, the user may disarm the alarm device by utilizing an NFC-enabled device, referred to herein as the disarming device. The disarming device is configured to read the unique identification associated with the carrier 100 and subsequently disarm the alarm device 101 by writing a specific coded message to the "emulated" NFC tag of the alarm device 101. This operation transitions the alarm device 101 from the "armed" state to the "disarmed" state, thereby enabling authorized access to the carrier 100 while maintaining a record of the interaction.

Additionally the disarming device will collect information identifying the user by, for example, reading a user credential, entering a pin code, etc.

The collected information consisting of information identifying the user, unique carrier 100 identification, and timestamp can be communicated by the disarming device to a database for further reporting and/or maintaining a tracking history and providing tracking status updates to users.

Once disarmed, the alarm device 101 will reenter the power down "off" state to preserve battery 115 life.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DRAWINGS

Call Outs

Figure 1:
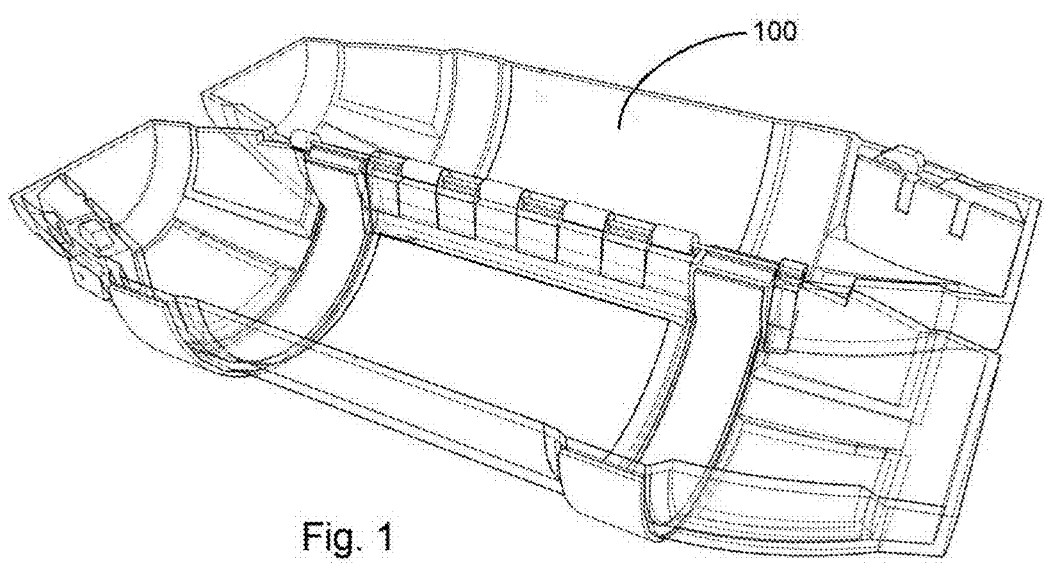
FIG. 1A perspective view of a pneumatic tube without the alarm device.
Figure 2:
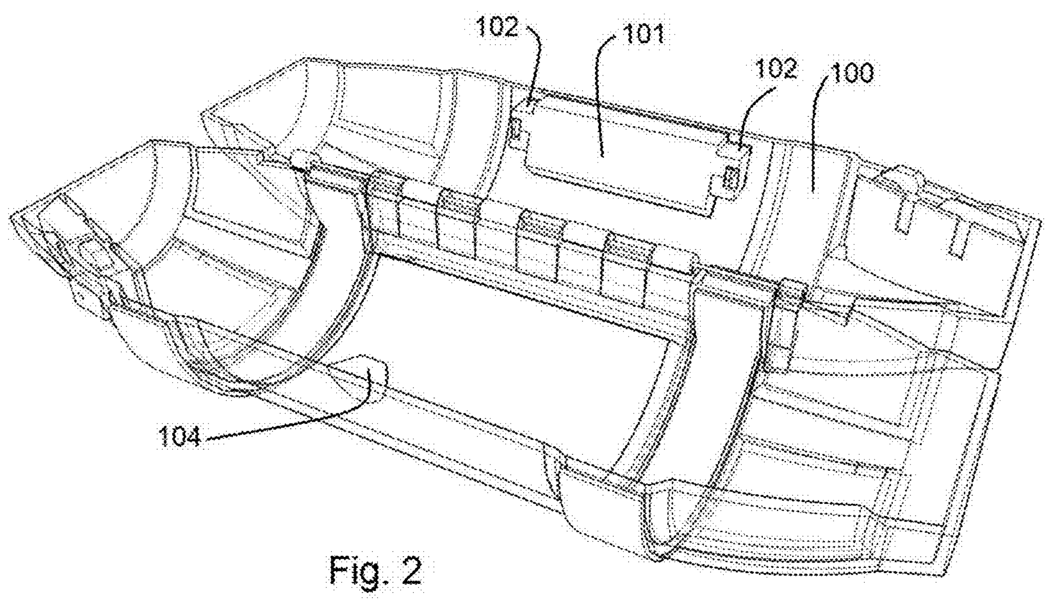
FIG. 2A perspective view of a pneumatic tube with the alarm device.
Figure 3:
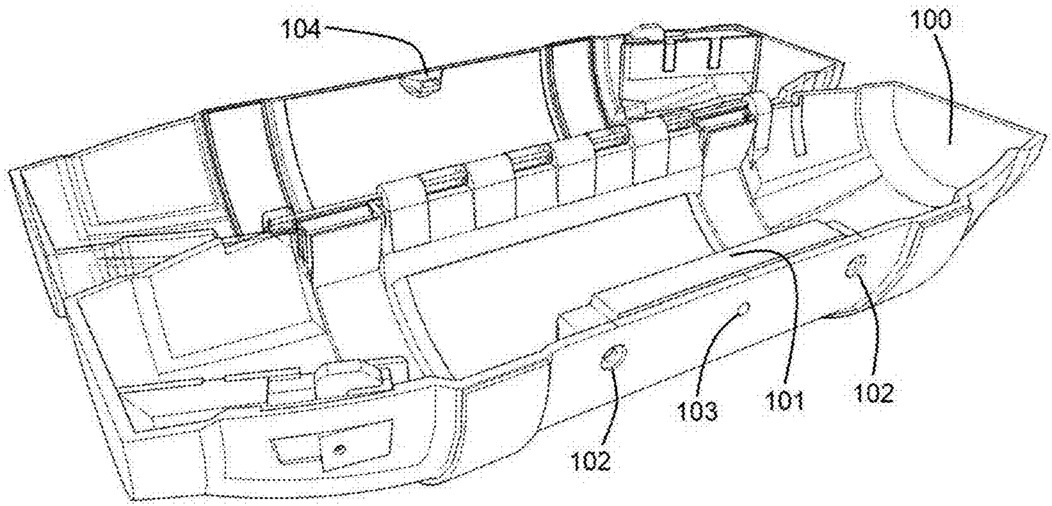
FIG. 3A front perspective view of a pneumatic tube with the alarm device.
Figure 4:
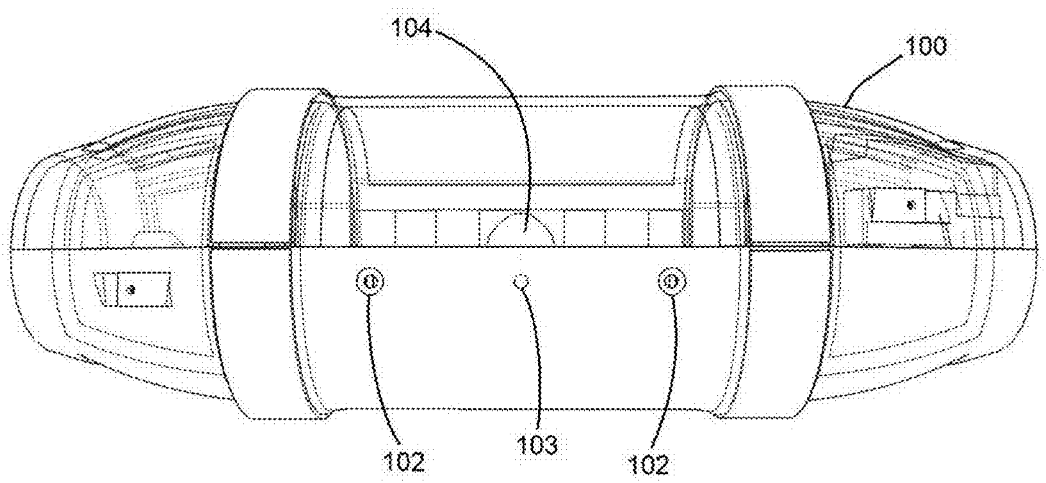
FIG. 4A closed front view of a pneumatic tube with alarm device.
Figure 5:
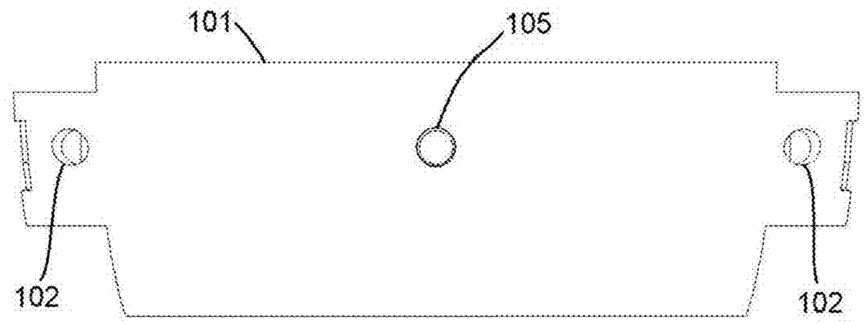
FIG. 5A front view of the alarm device.
Figure 6:
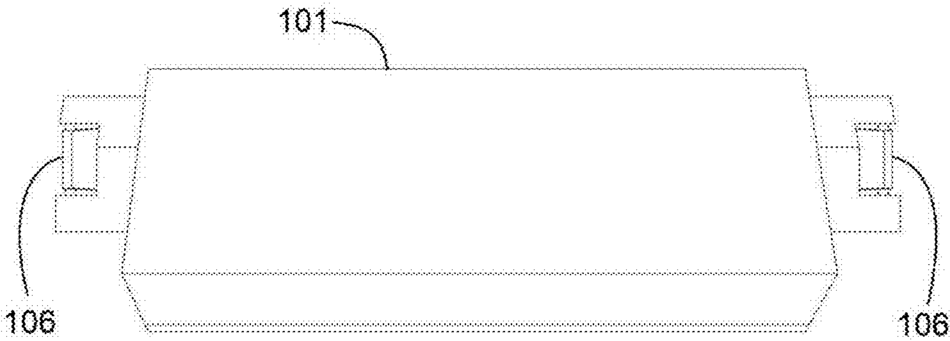
FIG. 6A back view of the alarm device.
Figure 7:
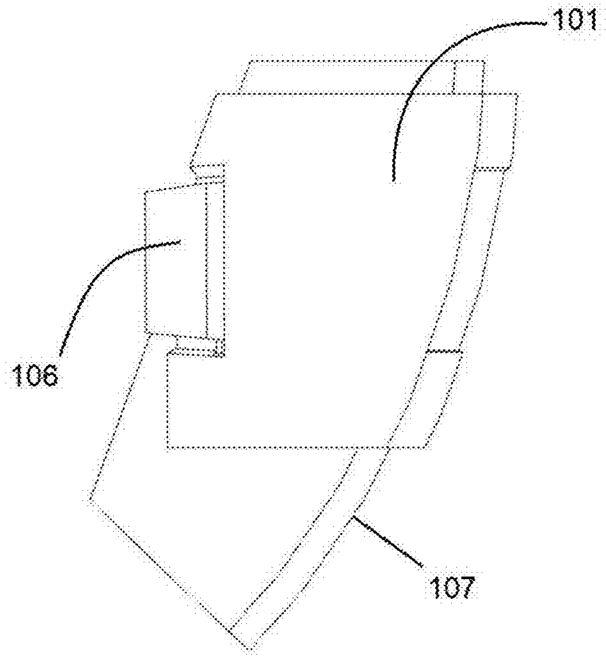
FIG. 7A side view of the alarm device.
Figure 8:
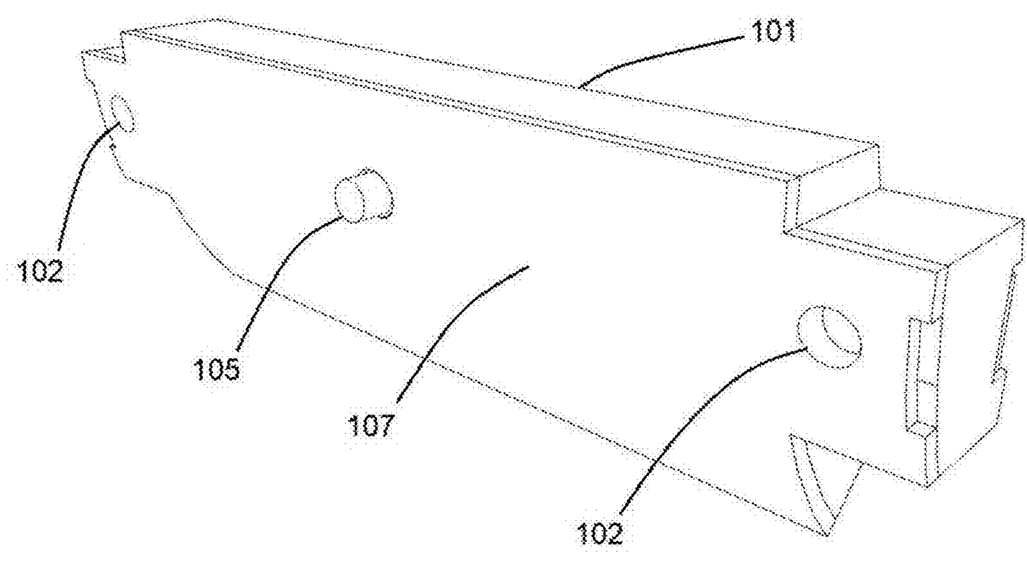
FIG. 8A perspective view of the alarm device.
Figure 9:
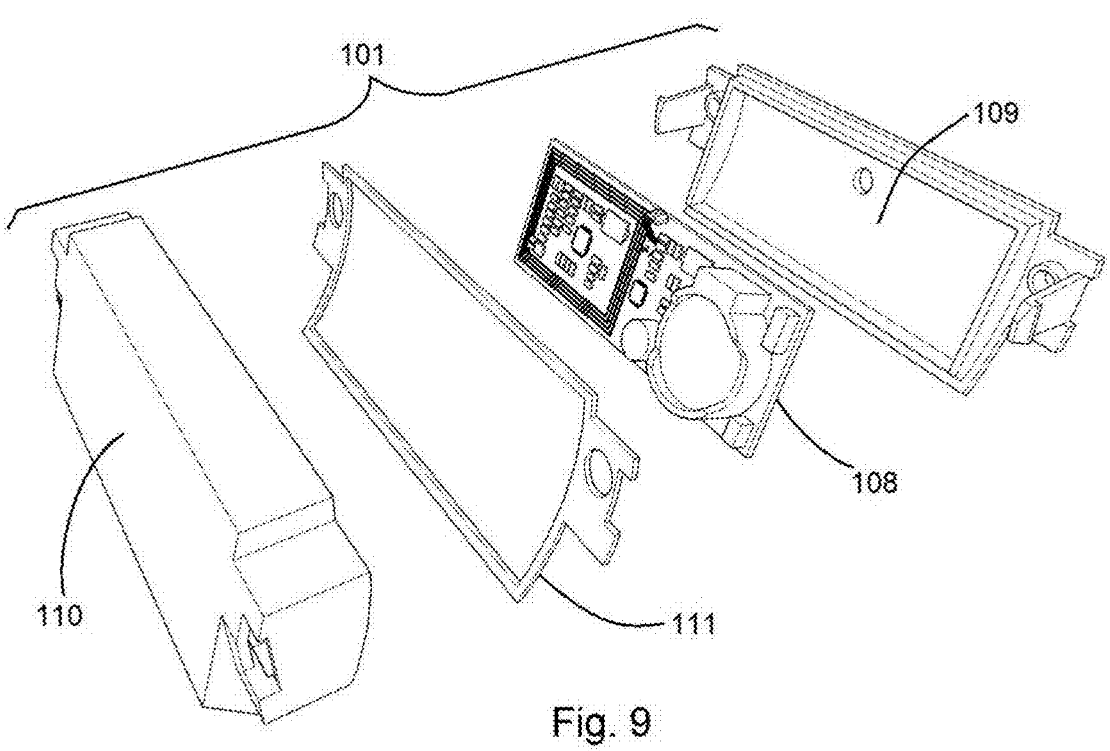
FIG. 9 An exploded view of the alarm device.
Figure 10:
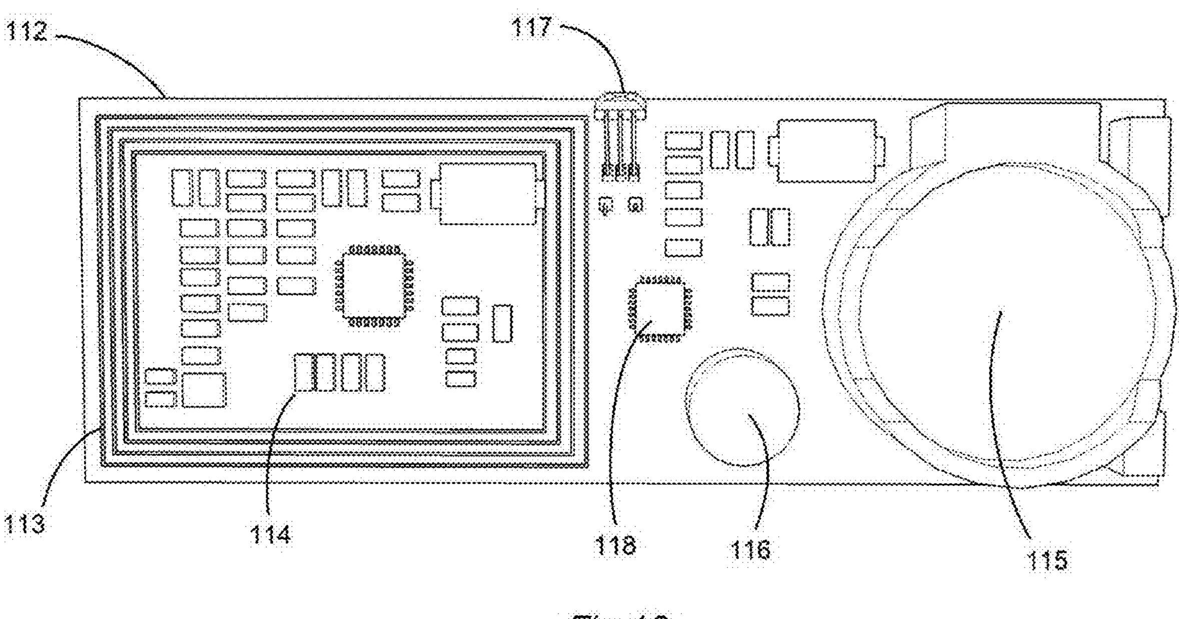
FIG. 10A front view of the alarm device board.
Figure 11:
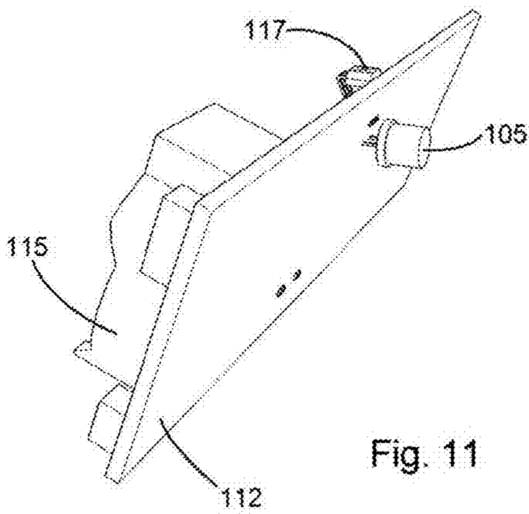
FIG. 11A perspective view of the alarm device board
Figure 12:
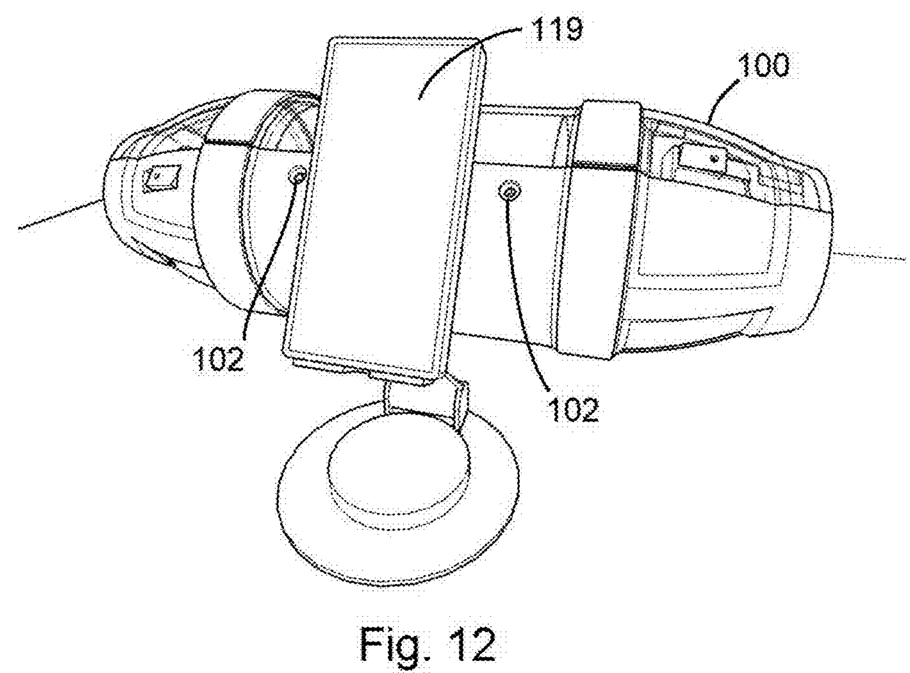
FIG. 12A perspective view of an arming device
Figure 13:
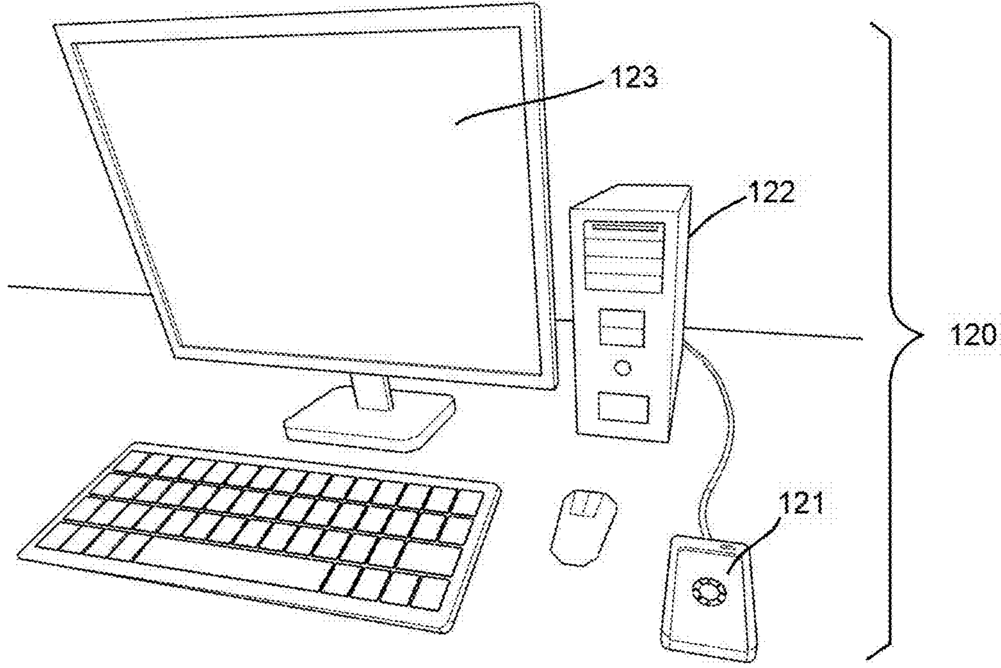
FIG. 13A perspective view of a disarming device

100 Carrier
101 Alarm device (whole body)
102 Mounting features
103 LED opening in carrier
104 Magnet
105 LED
106 Enclosure tabs/snaps
107 Curvature of enclosure
108 Alarm device electronic assembly
109 Enclosure front
110 Enclosure back
111 Gasket
112 Circuit board
113 NFC antenna
114 NFC circuitry
115 Coin cell battery
116 Audible buzzer
117 Hall effect sensor
118 Microcontroller
119 Smartphone running an NFC application
120 NFC-enabled system
121 NFC read/write device
122 Computing device
123 Display device

We claim:

1. A system for tracking transported items, the system comprising:

a. at least one non-locking container fitted with an alarm device configured to produce a local annunciator comprising an audible or visual alert on the container;

b. an arming device at a loading location; and c. a disarming device at an unloading location;

d. wherein the alarm device is configured to be armed by the arming device and disarmed by the disarming device, and while armed, is configured to immediately activate the local annunciator on the container if the container is opened; and e. wherein the arming device is configured to collect information related to the contents of the container, and the disarming device is configured to collect information identifying the user who operates the disarming device, such that the collected information is used to link the contents of the container to the identity of the user who operates the disarming device.

2. The system of claim 1, wherein the arming device and disarming device each comprise at least one of a smartphone executing an NFC application or a dedicated NFC reader configured to communicate with the alarm device via near-field communication (NFC).

3. The system of claim 2, wherein the arming device and disarming device are the same device.

4. The system of claim 2, wherein the arming device and disarming device are also configured to collect a unique container identification, said unique container identification being used to link the contents of the container to the identity of the user who operates the disarming device across a plurality of containers.

5. The system of claim 4, wherein the local annunciator comprises a buzzer integrated into the alarm device and configured to generate an audible alert upon opening of the container while armed.

6. The system of claim 1, wherein the local annunciator comprises at least one of:

(i) a buzzer integrated into the alarm device configured to generate an audible alert; and (ii) a light-emitting device mounted on the container configured to generate a visual alert.

7. A method for tracking transported items, the method comprising:

a. providing at least one non-locking container fitted with an alarm device configured to produce a local annunciator comprising an audible or visual alert on the container;

b. positioning an arming device at a loading location and a disarming device at an unloading location;

c. arming the alarm device using the arming device at the loading location;

d. collecting, by the arming device, information related to the contents of the container at the loading location;

e. immediately activating the local annunciator on the container upon opening of the container while the alarm device is armed;

f. disarming the alarm device using the disarming device at the unloading location;

g. collecting, by the disarming device, information identifying a user who performs the disarming; and h. associating the collected information related to the contents of the container with the information identifying the user, such that the contents of the container are linked to the identity of the user.

8. The method of claim 7, wherein arming and disarming the alarm device comprises communicating, via near-field communication (NFC), between the alarm device and at least one of a smartphone executing an NFC application or a dedicated NFC reader.

9. The method of claim 8, wherein the arming device and disarming device are the same device.

10. The method of claim 8, wherein the arming device and disarming device are also configured to collect a unique container identification, said unique container identification being used to link the contents of the container to the identity of the user who operates the disarming device across a plurality of containers.

11. The method of claim 10, wherein activating the local annunciator comprises generating an audible alert using a buzzer integrated into the alarm device.

12. The method of claim 7, wherein activating the local annunciator comprises generating an audible alert using a buzzer integrated into the alarm device or generating a visual alert using a light-emitting device mounted on the container.

* * * * *